April 26, 1960

H. S. HAWKINS 2,934,107

WORK FEED DEVICE FOR MACHINE TOOLS

Filed Dec. 2, 1957

5 Sheets-Sheet 1

INVENTOR

HAVILAH S. HAWKINS

BY

ATTORNEYS

INVENTOR
HAVILAH S. HAWKINS
BY
ATTORNEYS

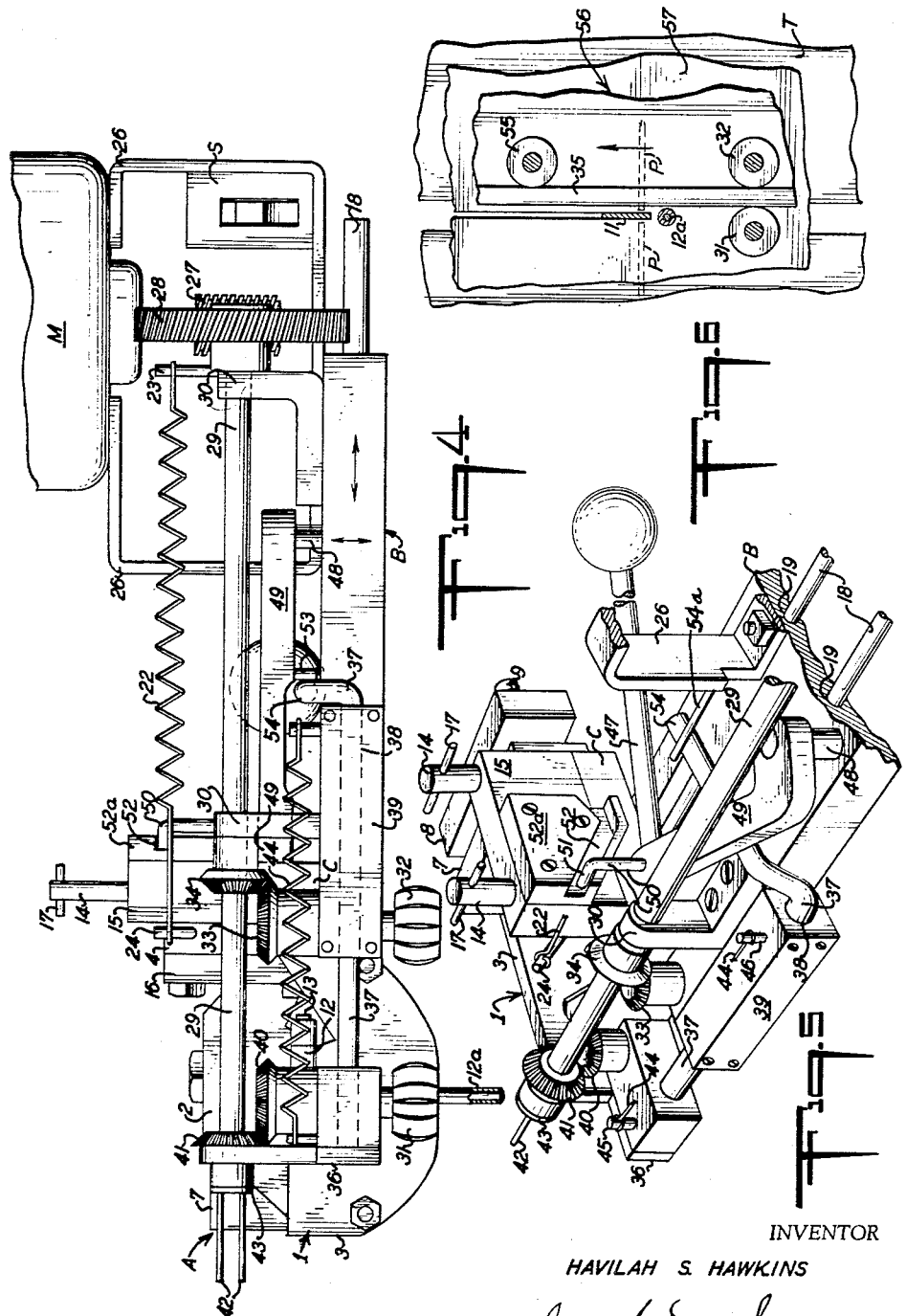

April 26, 1960 H. S. HAWKINS 2,934,107
WORK FEED DEVICE FOR MACHINE TOOLS
Filed Dec. 2, 1957 5 Sheets-Sheet 4

INVENTOR
HAVILAH S. HAWKINS
BY
ATTORNEYS

April 26, 1960 H. S. HAWKINS 2,934,107
WORK FEED DEVICE FOR MACHINE TOOLS
Filed Dec. 2, 1957 5 Sheets-Sheet 5
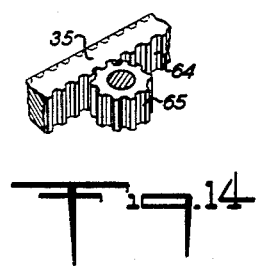
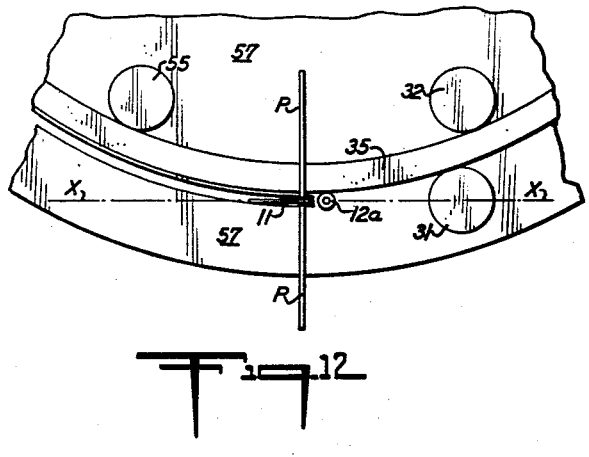
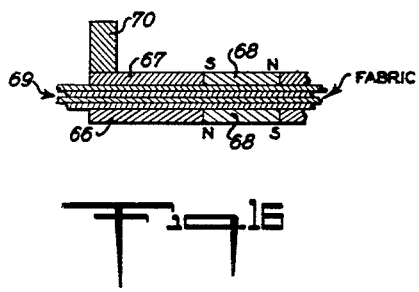
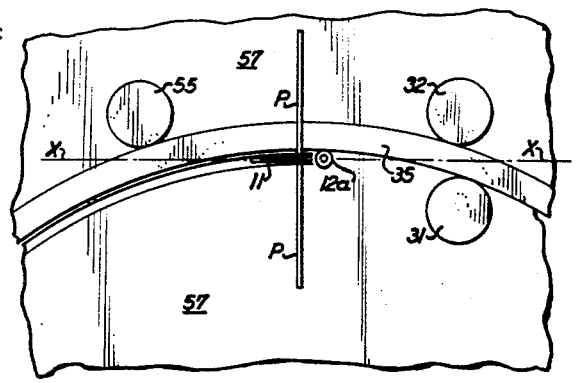
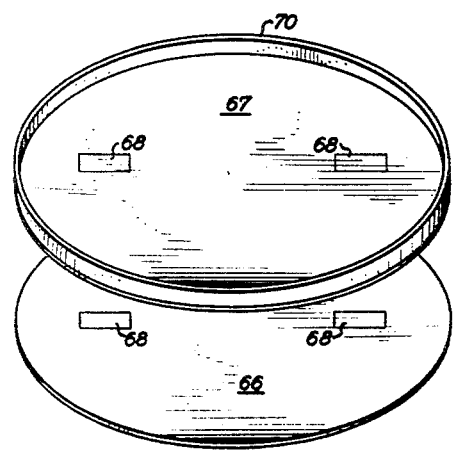
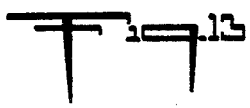
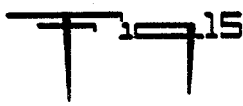
INVENTOR
HAVILAH S HAWKINS
BY
ATTORNEYS United States Patent Office 2,934,107
Patented Apr. 26, 1960

2,934,107
WORK FEED DEVICE FOR MACHINE TOOLS
Havilah S. Hawkins, Sedgwick, Maine
Application December 2, 1957, Serial No. 700,099
18 Claims. (Cl. 143—171)

This invention is a work feeding mechanism for machine tools having a work table on which a work piece is supported while being operated upon by the machine. The invention has general utility in respect to machines of this character including wood sawing machines, routers, cutting torches, sewing machines and the like but is particularly adapted for use with band sawing machines.

One object of the invention is to provide a work feeding mechanism for a machine of the character disclosed which may be mounted on the machine above the work table in a manner such as to be readily engagable with a work unit supported on the work table of the machine.

Another object of the invention is to associate with a work piece a pattern member which includes an upstanding rib formation contoured to correspond to the desired profile of the finished work piece and to provide drive means for engaging the rib formation of the pattern member to move the work piece and pattern member as a unit into the saw or other tool while simultaneously and automatically manipulating the work unit on the work table in respect to the saw in accordance with the contour of the pattern rib traversed by the drive means.

Another object of the invention is to provide novel magnetic means for securing a work piece and a pattern member together as a unit for feeding movement to the tool.

Another object of the invention is to provide a combined saw guide and work guard for the saw together with means for resiliently urging a work unit, such as above described, into engagement with the work guide as the work unit is fed into the saw.

Another object of the invention is to provide means for facilitating operative engagement between the drive means for the work unit and the upstanding rib formation on the pattern member with which the drive means are engaged in a work feeding operation.

A further object of the invention is to provide means on the drive rib of the pattern member which will cooperate with a switch operator so that the means for feeding the work unit into the saw may be deenergized after a predetermined feeding operation of the work unit.

Figure 1:
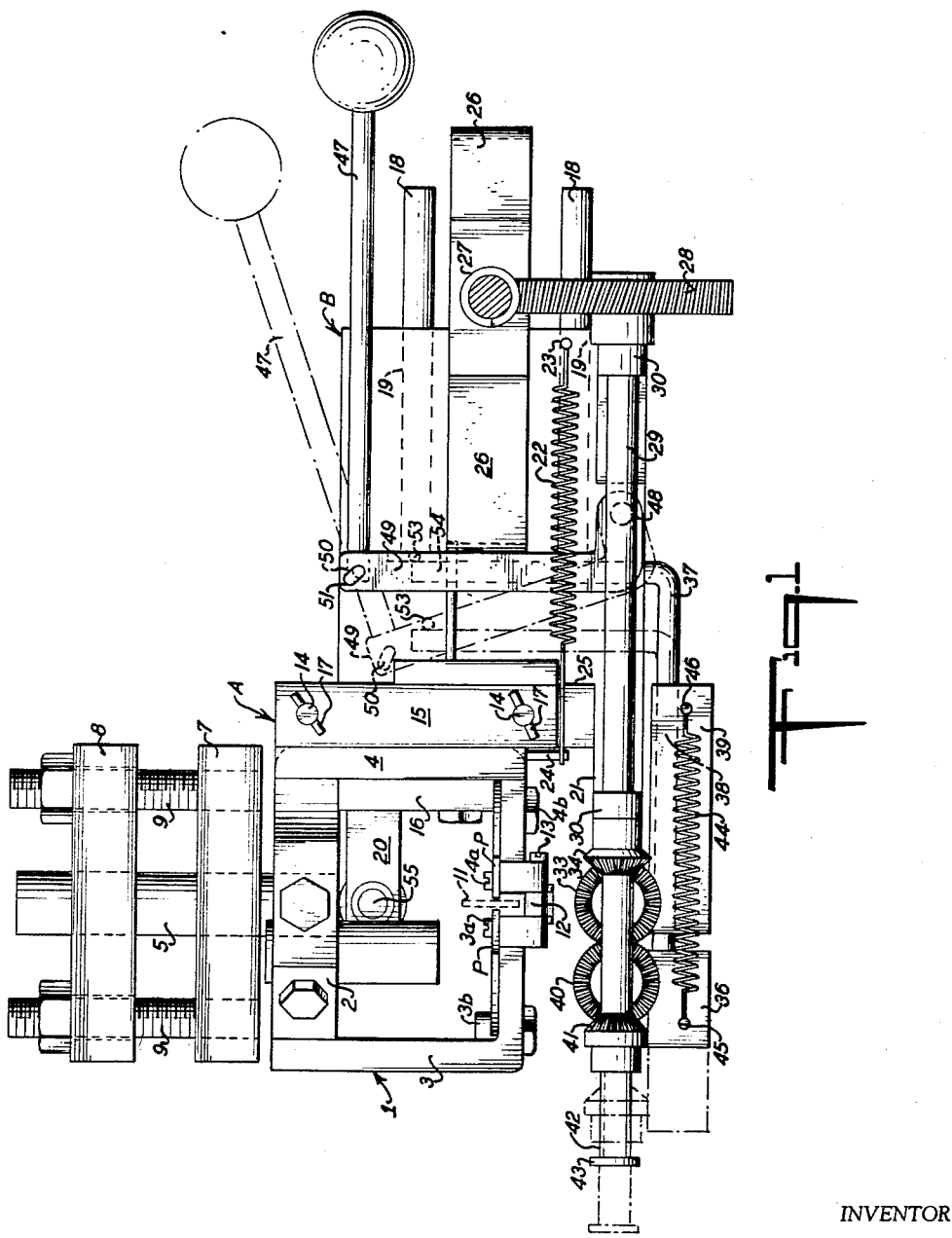
Figure 2:
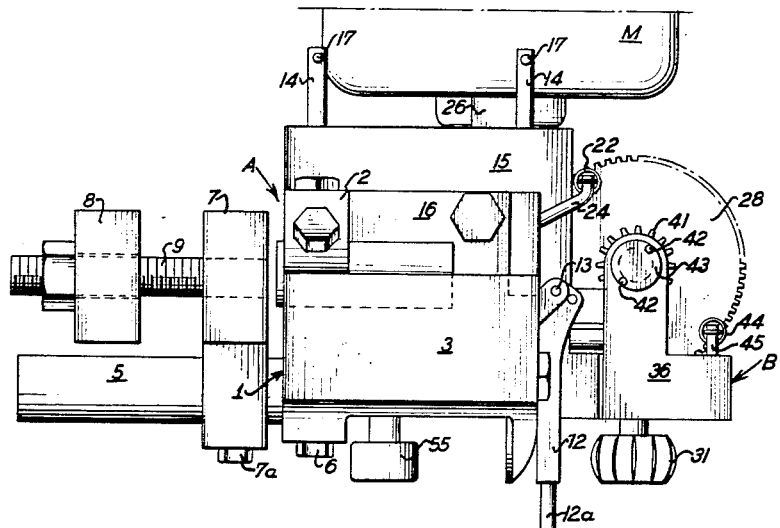
Figure 3:
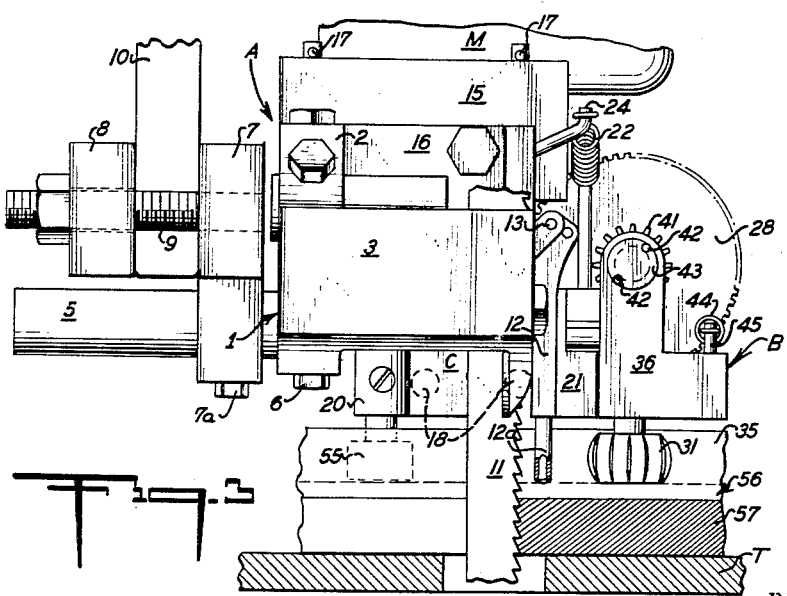
Figure 7:
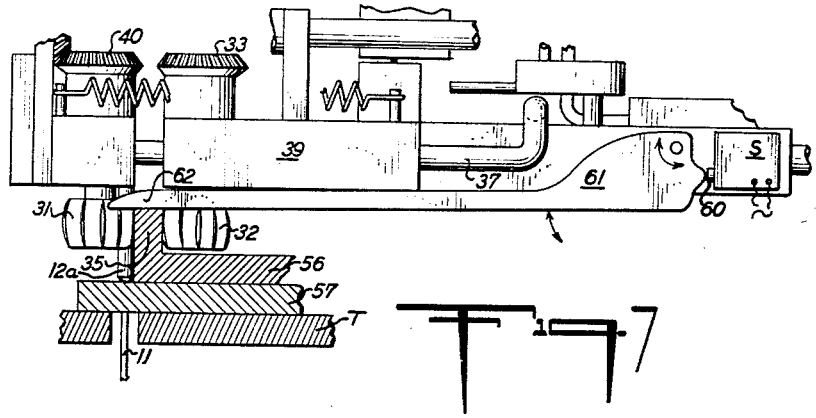
Figure 8:
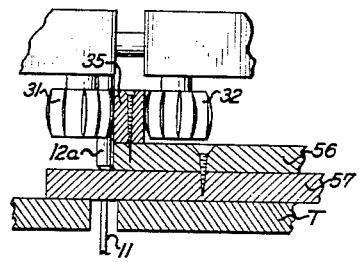
Figure 9:
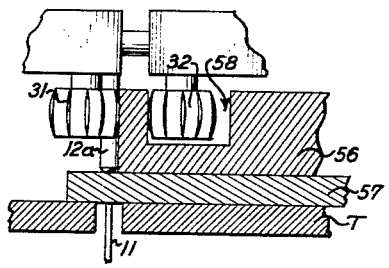
Figure 10:
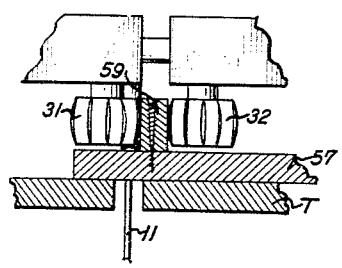
Figure 11:
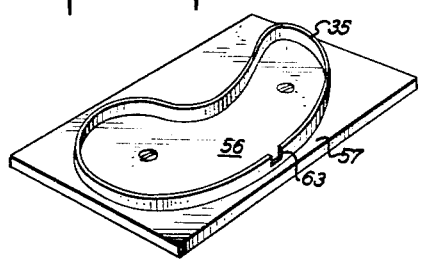

These and other objects of the invention will become apparent from a consideration of the following specification when read in the light of the accompanying drawings in which Fig. 1 is a top plan view of my invention;
Fig. 2 is a side elevation of my invention with the feed rollers in raised position;
Fig. 3 is a side elevation of the invention shown mounted in operative position upon a sawing machine with the rollers in driving position, parts of the sawing machine being shown in section;
Fig. 4 is front elevation of my invention showing the drive rollers raised and separate;
Fig. 5 is a fragmentary perspective view, parts being shown in section;
Fig. 6 is a diagrammatic view showing the relative position of the rollers, saw blade, and saw guard member;
Fig. 7 is a detail view showing the arrangement of the control switch and automatic cutoff therefor;
Figs. 8, 9 and 10 are detailed views more or less diagrammatic, showing modified forms of drive rib formations for the pattern member;
Fig. 11 is a perspective view of a work unit;
Fig. 12 is a diagrammatic view of the saw making an outside curve cut;
Fig. 13 is a diagrammatic view of the saw making an inside curve cut;
Fig. 14 is a detail perspective view showing a modified form of drive means for the work unit;
Fig. 15 is a perspective view of a modified form of pattern securing means;
Fig. 16 is a detailed sectional view of the pattern securing means of Fig. 15 applied to a multiplicity of plies of fabric.

In the accompanying drawings wherein I have shown a preferred modification of my invention and wherein like reference numerals are used to designate like parts throughout, the invention is shown as comprising a supporting bracket structure designated generally by the reference character A, a base member B, and a guide block C. The supporting bracket structure A corresponds generally to the structure shown in my Patent 2,765,008 of October 2, 1956, said patent being directed to a novel form of combined saw guard and work guide. Since said patent contains a complete and detailed description of the combined work guide and saw guard, only those portions of said apparatus which are important in respect to the present invention, will be referred to herein.

The supporting structure A includes a yoke-shaped frame member 1 (see Fig. 1) having a back portion 2 and forwardly extending arms 3 and 4. The back portion 2 carries a rearwardly extending generally cylindrical lug 5 secured within a suitable bore in said back member 2 by any suitable means such as a set screw 6. Adjustably mounted on the lug 5 is a pair of clamping plates 7 and 8. The clamping plate 7 may be secured in any desired position lengthwise of the lug 5 by any suitable means such as a set screw 7a and carries rearwardly extending screw-threaded bolt members 9 which pass through apertures in the second clamping plate 8 so that the device as a whole may be rigidly supported on a frame portion of the sawing machine such as the head frame thereof as is shown at 10 in Fig. 3. The yoke-shaped frame member 1, together with the arms 3 and 4 thereof is designed to embrace a saw blade 11 as shown in dotted lines in Fig. 1. The forward ends of the arms 3 and 4 are turned inwardly toward one another and at their spaced free ends support a combined work guide and saw guard 12. The saw guard and work guide 12 is in the form of a pin or finger disposed in front of and in substantial coplanar alignment with the saw blade as fully described in my former Patent 2,765,008. Preferably the finger member 12 is pivotally mounted from the adjacent inturned ends of the arms 3 and 4 as shown at 13. The finger 12 is fitted with a rotatable sleeve 12a at its lower pattern-engaging portion, as will hereinafter be more particularly described. The arms 3 and 4, adjacent the free extremities thereof, each carries a saw blade positioning member or support P. The members P (as shown in Fig. 4 of my Patent 2,765,008) are semi-circular plate-like members adjustably mounted in opposed spaced relation on opposite sides of the blade slot by pivot screws 3a and 4a and may be clamped in proper position with respect to the plate by clamping screws 3b and 4b respectively engaging the edges of the members P. The adjacent edges of the members P lie on opposite sides of the blade substantially at the base or root line of the saw teeth and in close proximity to the side faces of the blade. As fully explained in my Patent 2,765,008, the members P are designed to restrain the toothed edge portion of the saw blade against lateral deflection when the saw is making a cut along a curved line.

The base member B which carries the drive means for feeding work units to the saw is mounted upon the frame member 1, or its equivalent, for relative movement along each of two axes perpendicular with respect to one another. Thus, viewing the invention as illustrated in Fig. 4, the base member B is mounted for relative movement with respect to the supporting frame 1 in directions indicated by the arrows shown in this figure. To this end, the guide block member C is mounted for up and down sliding movement with respect to the frame 1 by a pair of upstanding guide pins 14 carried by said block, and which pins are slidingly mounted within bores in a plate 15 secured to the outside face of the arm 4 of the frame 1. If desired, the arm 4 of the frame 1 may be stiffened by a plate 16 secured to the inner face thereof as shown in Fig. 1. The block C thus is freely mounted for up and down sliding movement with respect to the frame 1 and within desired limits as defined by stop pin means such as 17 carried by one or both of the guide pins 14.

The guide block C also provides means for supporting the base member B for sliding movement towards and from said block and to this end the guide block C is provided with a pair of laterally extending guide rods 18 which are slidingly engaged in appropriately positioned bores 19 provided in the base B and extending longitudinally therethrough. The base member B is generally rectangular in form but the end thereof adjacent the block C is cut away or bifurcated to provide spaced arms 20 and 21, as shown in Fig. 1.

The base member B is resiliently urged toward the guide block C by spring means 22, the opposite ends of which are anchored to the base B at 23 and to the arm 4 of the frame 1 at 24. This normally biases base B to the left as viewed in Fig. 1 so that the base 25 of the bifurcation is in engagement with the right-hand face of the guide block C. As previously stated, the base member provides support for the drive means for feeding the work to a sawing machine and to this end there is mounted on the base B an electric motor M supported by conventional brackets 26. The motor M is preferably mounted so that its axis is substantially vertical and the drive shaft of the motor carries a worm 27 (Fig. 4) which is operatively engaged with a worm wheel 28 secured to a drive shaft 29 mounted in conventional bearings 30 carried by the base B. The drive shaft 29 extends generally longitudinally of the base member B near one edge thereof (see Fig. 1). The drive shaft 29 is arranged to drive a pair of drive rollers 31 and 32 mounted for rotation about substantially vertical parallel axes, the rollers 31 and 32 being disposed slightly below the general plane of the base B as shown. The roller 32 is mounted on a shaft journaled for rotation in suitable fixed bearing means carried by the base B, and at its upper end said shaft is provided with a miter gear 33 which is meshed with a companion miter gear 34 secured to the drive shaft 29. The rollers 31 and 32, as will hereinafter more clearly appear, are designed to engage opposite side faces of a pattern rib formation 35, and to this end are arranged for relative movement towards and from one another to permit the insertion of the drive rib therebetween. Thus, the drive roller 31 is mounted on a block 36 which is mounted for sliding movement on the base member B, in generally coplanar relation thereto, and in a direction parallel to the axis of drive shaft 29. For this purpose, the block 36 is provided with a guide pine 37 (Figure 5) which extends longitudinally of and in sliding engagement with a bore 38 which extends lengthwise through a block 39 secured to the side face of the base B as shown in Fig. 4. The block 36 rotatingly carries the shaft of the roller 31 and said shaft at its upper end is provided with a miter gear 40 which meshes with a companion miter gear 41 carried by drive shaft 29. The miter gear 41 is splined to the shaft 29 by any convenient means such as the spaced longitudinal pins 42 carried by the hub of gear 41, which pins are slidingly engaged with the disc 43 secured to the shaft 29. Spring means 44 is provided for urging the block 36 towards the base B to bring the roller 31 normally into yielding contact with the roller 32. The spring means 44 has its opposite ends anchored to pins 45 and 46 carried respectively by the block 36 and the block 39. It should be noted at this point that the rollers 31 and 32 are driven in opposite directions so that when engaged with opposite faces of a pattern rib 35 they will cooperate to drive the work piece attached to the pattern in the same direction and toward the saw.

I provide means for facilitating engagement between the rollers 31 and 32 and the pattern rib such as 35. This means comprises a manually operated lever 47 mounted for pivotal movement about an upright pivot pin 48 on the base B. The lever 47 includes intermediate its ends a cam member 49 which, when the lever is moved counterclockwise from the full line to the dotted line position of Fig. 1, engages the adjacent face of the block C to force the base B away from said block against the tension of the spring biasing means 22. This operation moves the base B away from the work guide finger 12 and carries the roller 32 in the same direction away from said pin. Means are also provided for simultaneously raising the plate B with reference to the finger pin 12 and the frame 1, it being noted that the base B normally occupies a position such as shown in Fig. 3 wherein the stop pins 17 are engaged with the upper face of the block C. To this end the cam portion 49 of the lever 47 carries an upstanding pin 50 which has a laterally directed end portion 51 positioned to engage a cam slot 52 (Fig. 4) provided in the outer face of a block 52a secured to the outer side face of the block 15 as clearly shown in Fig. 5. The design of the cam slot 52 and the pin 50—51 is such that continued counterclockwise movement of the lever 47 as viewed in Fig. 1 causes the end 51 of the pin 50 to enter the flared mouth of the cam slot 52, and this in turn causes the base B to rise as the pin travels up the inclined cam track, to an extent sufficient for the rollers 31 and 32 to clear the vertical extent of the pattern drive rib 35. The lever 47 is also arranged to move the block 36 and its drive roller 31 to the left, as shown in Fig. 4, against the tension of the spring biasing means 44, so that the rib formation 35 may be entered between the finger 12 and the adjacent end of the base B, with the roller 31 and the finger 12 on that side face of the pattern rib 35 which is adjacent to the saw blade, and with the roller 32 on the opposite side face of said rib. This movement of the roller 31 is accomplished by providing a downwardly directed pin 53 on the underside of the cam portion 48 of lever 47, said pin being disposed to engage an upturned end 54 of the guide pin 37 with said end 54 overlapping the upper face of base B. It will be understood that the engagement between the pin 53 and the end 54 of the guide rod 37 forces the guide rod to the left as viewed in Fig. 4, thus carrying the block 36 and the drive roller 31 in the same direction. The drive rollers 31 and 32 are thus separated and simultaneously raised as the lever 47 is operated, and at the same time the base member B is moved to the right as shown in Fig. 4. This gives clearance between the drive rollers and the work table T of the machine in order to position a work unit beneath the drive rollers with the rib 35 disposed between the separated rollers 31 and 32. A horizontal guard pin 54a is provided on the base B, and positioned to overlie the free end 54 of the pin 37 to maintain said end 54 in operative relation to the base. A further rib-engaging roller 55 is mounted in depending relation on the forward end of the arm 20 of the bifurcation in the base plate B, the rollers 55 and 32 being mounted with their axes generally coplanar and substantially equidistant from the plane of the saw blade restricting members P—P. As shown in Fig. 6 these rollers 32 and 55 are disposed to engage that face of rib 35 remote from the finger 12. Thus the rollers 32 and 55 are spaced equidistant on opposite sides of the plane of the blade restricting members P—P and moved in unison with all movements of the base B. This arrangement insures that the blade is always substantially tangent to the curved contour being cut by the saw as shown clearly by lines X—X, Fig. 12 and 13 in diagrammatic views of Figs. 12 and 13.

The diagrammatic view of Fig. 6 also shows the arrangement of the rollers 31, 32, and 55, with respect to the finger 12 when the device is in operation, the guide rib 35 being maintained yieldingly in engagement with the finger 12 by the biasing spring 22, while the biasing spring 44 maintains the rollers 31 and 32 yieldingly in driving engagement with opposite side faces of rib 35.

Previous reference has been made herein to a pattern member including an upstanding rib formation such as shown at 35. The pattern member may take any one of several forms such as shown in Figs. 8, 9 and 10. In Fig. 8 the pattern member 56 is shown as a sheet of plywood or similar material having on the upper face thereof an upstanding rib portion 35, the pattern member being in turn secured to the upper face of a work piece 57. The upstanding rib formation 35 of the pattern piece is contoured in accordance with the desired profile of the finished work piece and, as previously described, the work unit, including the work piece 57 and attached pattern member 56 are resiliently urged against the finger pin 12 as shown in Fig. 8 so that as the work unit is moved into the saw, the finger pin 12 automatically follows the contour of the pattern rib with the result that the finished work piece will have a profile corresponding to the contour of the rib 35.

In another form of pattern piece as shown in Fig. 9, the pattern may comprise a sheet of wood or similar material having a routed groove 58 near its outer edge, said groove being contoured to correspond to the desired profile of the finished work piece and of a transverse dimension to receive the rollers 32 and 55.

In Fig. 10 a further modification of pattern piece is shown wherein a band or strip of bendable material 59 is secured to the work piece and contoured to provide the desired profile in the finished work. The common characteristic of all these pattern pieces is that they include an upstanding rib formation contoured to the desired profile of the finished work piece and arranged so that the drive rollers 31 and 32 may engage opposite faces of said rib to move the pattern and associated work pieces into the saw and thus automatically reproduce in the work piece the contour of the pattern.

It will be understood that when in use, a work piece having a pattern member attached to its upper surface is supported upon the work table T of the sawing machine as shown in Fig. 3 with the rollers 31, 32, and 55 engaged with the drive rib of the pattern piece as indicated in Fig. 6. When the rollers are driven, the work unit is guided into the saw in a manner such that the guide pin or finger 12 in traversing the outer contoured edge of the pattern rib will automatically cause the work unit to be moved with respect to the saw blade so that the contour of the pattern piece is duplicated in the profile of the finished work.

As a further feature of my invention, I provide means for automatically terminating the sawing operation after the work unit has been moved with respect to the saw an amount to complete substantially the desired profile. To this end, I may provide a switch means for controlling energization of the motor M, said switch S as shown in Fig. 7 being conveniently mounted on the base B and having an actuating button 60 positioned to be engaged by a pivoted operating lever 61 mounted on the side edge of the base B. The lever 61 has its free end 62 extended forwardly to overlie the drive rib 35 of the pattern piece. If desired, any suitable biasing means (not shown) may be provided for urging the free end 62 of the lever 61 into sliding contact with the upper surface of the rib 35, or the lever 61 may be designed so that this engagement is insured by the force of gravity. The upper surface of the rib 35 may be provided with a notch 63 (see Fig. 11) dimensioned to receive the free end 62 and the lever 61. With the parts so designed, the end 62 of the lever 61 will ride along the top surface of the rib 35 until it encounters the notch 63 at which time it will fall into the notch, thereby actuating the button 60 to open the switch S and stop the motor M. Thus, the lever 61 may be initially oriented with the notch 63 so that after a complete traverse of the rib 35 by said lever, the lever will fall into the notch 63 and stop the sawing operation at the point where the work piece has been substantially completely severed from the original blank.

From the foregoing specification, it is clear that I have provided novel means for automatically feeding work to a sawing machine and simultaneously guiding it with reference to the saw blade by the described cooperation between the work guide finger and a pattern member secured to the work. In the absence of the guide finger, the feed means will operate to feed the work in the saw but under these circumstances the operator would be obliged to guide the work properly with respect to the saw blade to produce a work piece having a profile corresponding to the contour of the pattern member.

It will also be understood that the drive means for the work includes spring-pressed drive rollers engageable with an upstanding rib formation on pattern member, together with means for manually separating and raising the rollers with respect to a work unit supported on the saw table in order to facilitate engagement between the drive rollers and the pattern rib. Furthermore, the pattern rib may be notched to cooperate with a switch operator to terminate the sawing operation at a desired point.

In the foregoing description the drive rollers 31 and 32 have been shown as friction drive rollers and preferably each of said rollers carries a rubber or similar friction surface. In instances where the work unit is heavy or bulky, it is desirable to provide positive drive means between the rollers and the work unit and with this in mind I have shown in Fig. 14 the pattern rib 35 provided on one or both upright faces thereof with gear teeth 64, said teeth extending substantially perpendicular to the plane of the work piece to which the pattern member is attached. The pattern rib and gear teeth 64 in this instance may be in the form of a rack contoured to the desired profile of the finished work piece and the rack may be secured to the work piece in any convenient manner such as suggested in the several modifications shown in Figs. 7 through 10 of the drawings. In this form of the invention one or both drive rollers are in the form of pinion gears such as shown at 65, carried by the drive shafts to which the miter gears 33 and 44 are secured as previously discussed in connection with friction rollers 31 and 32.

In instances where the work is of a character such that difficulty would be experienced in securing the pattern piece thereto by nails or screws such as has been suggested in Figs. 7 to 10 inclusive, I provided modified means for securing the pattern parts to work, such as, for example, paper, cardboard or cloth. In the garment industry, for instance, it is common practice to saw or cut a multiplicity of plies of superposed fabric and my pattern pieces including the contoured upstanding rib may be secured to a pile of superposed fabric pieces by placing the same between a pair of plate members such as are shown at 66 and 67 in Figs. 15 and 16. The plates 66 and 67 may be formed of any suitable material such as plastic, fiberboard or the like and each of such plates has embedded therein or suitably secured thereto a plurality of permanent magnets such as indicated at 68. These magnets may be made of steel or of magnetic alloy such as Alnico and as shown in Fig. 15, the magnets carried by the bottom plate 66 are arranged so that their opposite poles will be in opposition to the poles of the magnets carried by the upper plate 67. When the plates 66 and 67 are disposed on the bottom and top surfaces of a pile of fabric plies 69 as shown in Fig. 16, with the magnets of the upper and lower plates aligned but with like poles in opposition, the magnetic attraction of the magnets will serve to hold the fabric plies firmly between the plates. As shown, the upper plate carries an upstanding pattern rib formation 70 corresponding to the pattern rib 35, said pattern rib 70 being contoured to correspond to the profile desired to be imparted to the fabric secured between the plates 66 and 67. As shown in Fig. 16, the fabric pieces 69 project beyond the perimeter of the pattern plates so that they may be simultaneously cut to a predetermined size and configuration, when the work unit including the plates and interposed fabric plies is fed to a cutting tool such as a saw. Desirably, a work unit such as here described could be automatically fed to the needle of a sewing machine for sewing a plurality of pieces of fabric together along a predetermined line in accordance with the contour of the pattern rib.

In operation of my invention, the work table of a machine equipped with the work feed device is adjusted vertically to a position in which a work unit placed on the table will have the drive rib 35 thereof disposed in general horizontal alignment with the drive rollers 31 and 32 when the base B is in its lower position such as shown in Fig. 3. The lever 47 is then moved to a position shown at dotted lines in Fig. 1 and in full lines in Figs. 4 and 5, in order to raise the base B and attached rollers 31 and 32, and to spread the rollers as shown in Fig. 4. In this position of the parts the rollers 31 and 32 will clear the rib 35 of the work unit and allow the work unit to be moved beneath the rollers towards the saw blade. Normally, the strip of the work piece which lies outside and beyond the line of cut will prevent the work unit being moved into a position in which the work guide finger 12 may contact the side face of the pattern rib so that it is necessary to make an initial cut with the saw at some convenient point in the periphery thereof to bring the saw into substantial coincidence with the desired line of cut and the lower end of the finger 12 into engagement with the outside face of the pattern rib. The lever 47 is then moved into the position shown in full lines in Fig. 1 to lower the base B with the drive rollers 31 and 32, and to permit the springs 22 and 44 to function to urge the rollers 31 and 32 into yielding contact with the pattern rib and to move the base B to the left as viewed in Fig. 4 so as to urge the work unit into engagement with the guard finger 12. The motor M is then energized to drive the rollers 31 and 32. Thereafter the manipulation of the work unit is accomplished automatically by the cooperation between the pattern rib and the guard finger 12 as the work is driven into the saw by the rollers 31 and 32. If the feed device is equipped with the automatic cutoff mechanism shown in Fig. 7, the initial cut is made in proximity to the notch 63 so that the lever 62 may be brought into engagement with the upper surface of the pattern rib as shown in Fig. 7, at a point just beyond said notch so that when the guard finger 12 has made a complete traverse of the pattern rib, the end of lever 62 will drop into said notch 63, thereby deenergizing the motor M and terminating the feed movement of the work unit.

It will be understood that the drawings are but for the purpose of illustrating preferred embodiments of the invention and those skilled in the art will recognize that a variety of different "tools" such as a cutting torch, a router or a sawing machine may be substituted for the band saw herein described and that various changes in the size and proportion or arrangement of parts may be made without departing from the spirit of my invention as outlined more particularly in the appended claims.

I claim:
1. A work feeding device for sawing machines comprising support means adapted to be secured to the head frame of a sawing machine, a base member mounted on said support means, a pair of spaced drive rollers mounted on the base for rotation about parallel axes substantially perpendicular to the general plane of the base, means for mounting said rollers on axes relatively movable toward and away from each other, means for driving said rollers in opposite directions, resilient means urging the rollers towards one another to grip a drive rib on a work unit when placed therebetween, and means for spreading said rollers against the force of said resilient means to facilitate the insertion of a drive rib between them.

2. The work feeding device described in claim 1 wherein the drive means for the rollers about parallel axes includes means for driving the rollers in all degrees of permissible separation of their axes.

3. The work feeding device described in claim 1 wherein the drive means for the rollers about parallel axes includes means for driving the rollers in all degrees of permissible separation of their axes and wherein at least one of said drive rollers is a pinion gear adapted to mesh with gear teeth provided on said rib.

4. A work feeding device for sawing machines comprising bracket means adapted to be secured to the head frame of a sawing machine, a base means mounted on said bracket member for up and down sliding movement with respect thereto, a pair of friction rollers carried by the base member, means mounting the friction rollers for rotation about spaced axes substantially parallel to the direction of up and down sliding movement of the base member, means on the base member for driving said friction rollers in opposite directions, means resiliently urging the friction rollers together to operatively engage opposite sides of an upstanding driving rib on a work unit and cooperating means on the base member and bracket means for temporarily raising the base member with respect to the bracket means to facilitate engagement of the friction rollers with said driving rib of a work unit.

5. A work feeding device for sawing machines comprising bracket means adapted to be secured to the head frame of a sawing machine, a guide block member slidingly mounted for up and down movement on said bracket means, guide means carried by said block member, a base member slidingly mounted on said guide means for movement to and from said block member, a shaft mounted for rotation on said base, a pair of friction rollers driven by said shaft about relatively movable axes substantially parallel to the direction of up and down movement of the block, means for yieldingly urging the friction rollers together and cooperating means on the base and bracket means for simultaneously spreading the rollers and for raising the base member with respect to the bracket means to facilitate drivingly engaging the rollers with an upstanding drive rib on a work unit.

6. A work feeding device for sawing machines comprising bracket means adapted to be secured to the head frame of a sawing machine, a base member, means mounting the base member on the bracket means for sliding movement along axes substantially perpendicular to each other, a pair of friction rollers on said base member, means mounting the friction rollers for rotation about substantially parallel axes relatively movable toward and away from one another, means resiliently urging the friction rollers towards each other to grip an upstanding drive rib on a work unit, means for driving said rollers in opposite directions, and manually operable means for simultaneously raising the base member along one of said axes, moving it away from the bracket means along another of said axes, and spreading the friction rollers to facilitate the operative engagement between the friction rollers and said upstanding drive rib on a work unit.

7. In combination with a saw guide including a finger member and mounting means therefor adapted to be secured to the head frame of a sawing machine for disposing said finger member in front of and in general coplanar alignment with a saw blade in said sawing machine, a work feeding device carried by said mounting means and including a base member mounted on said mounting means for sliding movement to and from said finger member, means resiliently urging the base member towards said finger member, a pair of drive rollers mounted on the base member for rotation about separable axes substantially parallel to the axis of said finger member, means for driving said rollers in opposite directions and means for simultaneously moving the base member away from said finger member and for spreading said rollers to facilitate the operative engagement of the rollers with the opposite faces of an upstanding drive rib provided on a work unit.

8. The combination recited in claim 7 wherein said base member is mounted for up and down movement with respect to the finger member and wherein the last-mentioned means in said claim 7 also raises the base member sufficiently with reference to the finger member to allow the drive rollers to clear the drive rib on a work unit.

9. The combination recited in claim 7 wherein said finger member carries a sleeve rotatable about the axis of said finger, and wherein there is provided on said base member an additional roller mounted for rotation about an axis substantially parallel to the axis of said drive rollers, said additional roller being positioned to engage the face of the drive rib remote from said finger member.

10. In combination, a work unit including a work piece and a pattern member secured thereto, said pattern member comprising an upstanding rib formation secured to an upper surface of said work piece, said rib including an upper, generally horizontal surface and spaced upright side surfaces adjoining said upper surface, drive means for feeding the work unit to a saw including opposed drive rollers respectively engaging said side surfaces, motor means to drive said rollers, circuit means for energizing said motor including a switch, operating means for the switch including a pivoted lever having a free end positioned to ride upon the upper surface of said rib formation, said rib being provided with a notch dimensioned to receive the free end of said lever and an operative connection between the lever and the switch for opening the switch when the free end of said lever falls into said notch.

11. In combination a sawing machine including a work table provided with an opening through which the saw operates, a saw guard and work guide including a finger member disposed in front of and substantially in coplanar alignment with the saw blade and terminating in spaced relation to the work supporting surface of the work table, a work unit including a work piece having a pattern member secured to an upper surface thereof, said pattern member including an upstanding rib formation, means for feeding the work piece to the saw beneath said finger member comprising opposed drive rollers, yieldingly engaged with opposite side faces of said rib formation, means to drive said rollers in opposite directions and resilient means urging the pattern member laterally against said finger member.

12. In combination with a sawing machine having a work table through which the saw operates, a combined saw guard and work guide positioned in front of and in coplanar relation to the saw, and blade restraining means disposed in coplanar relation and on opposing sides of the path of the saw substantially at the root line of the saw teeth; a work unit adapted to be supported on said table, said work unit including a work piece and a pattern member secured to the work piece, said pattern member having an upstanding rib formation, feed means for the work unit comprising drive rollers engageable with opposite side faces on said rib formation, said feed means including an additional roller engaging the side face of said rib formation remote from said saw, the axes of the drive roller and of said additional roller engaged with the same side face of the rib being disposed at points substantially equally spaced from and on opposite sides of the plane of said blade restraining members, means mounting said last-mentioned rollers for movement in unison towards and from the saw blade in a path substantially perpendicular to the plane of the saw blade, means for resiliently urging the said last-mentioned rollers against said rib formation to maintain the work unit in contact with said saw guard and work guide, and means for actuating said drive rollers to urge the work piece into the saw.

13. A portable work unit for sawing machines and the like comprising a work piece and a pattern member secured to the upper surface of the work piece, said pattern member including an upstanding rib formation contoured to provide a predetermined profile in the finished work, said pattern member including a plate-like member supporting the rib formation from beneath and carrying a plurality of spaced permanent magnets lying substantially parallel to the plane of the plate, and a second plate-like member carrying a plurality of spaced permanent magnets lying substantially in the plane thereof, said plate-like members being disposed in generally parallel relationship on opposite sides of and in contact with the upper and lower faces of the work piece and with the magnets of said plates in register and with like poles of the magnets of the upper and lower plates being arranged in opposition.

14. A work feeding device for sawing machines comprising support means adapted to be secured to the head frame of a sawing machine, a base member movably mounted on said support means, a pair of spaced drive rollers mounted on the base for rotation about parallel axes substantially perpendicular to the general plane of the base, means for mounting said rollers on axes relatively movable toward and away from each other in a plane generally transverse to the line of cut of the saw including means mounting one of said rollers for rotation about an axis fixed in respect to the base member, a third roller carried by the base member and mounted for rotation about an axis generally parallel to that of said one roller and spaced from said one roller in a direction such that the axes of said one roller and of said third roller lie in a common plane generally perpendicular to the plane of movement of said pair of rollers, resilient means urging said pair of rollers towards one another to grip a drive rib on a work unit when placed therebetween, means for spreading said pair of rollers to facilitate the insertion of a drive rib therebetween, and means for resiliently urging the base member transversely of said common plane and towards the saw.

15. A work feeding device for sawing machines comprising support means adapted to be secured to the head frame of a sawing machine, a base member movably mounted on said support means, a pair of spaced drive rollers mounted on the base for rotation about parallel axes substantially perpendicular to the general plane of the base, means for mounting said rollers on axes relatively movable toward and away from each other, means for driving said rollers in opposite directions, resilient means urging the rollers towards one another to grip a drive rib on a work unit when placed therebetween, means for spreading said rollers against the force of said resilient means to facilitate the insertion of a drive rib between them, and means for resiliently urging the base member in a direction substantially parallel to the plane in which the axes of said pair of rollers lie and transverse to the plane of cut of the saw.

16. In combination with a sawing machine including a work table having an opening through which the saw operates in a plane substantially transverse to the plane of the work table, a stationary guide finger supported above the work table in front of and in general alignment with the saw and terminating in spaced relation to the work table, a work unit including a work piece and a pattern member carried thereby for engagement with said finger, feed means for the work unit including feed rollers resiliently engaged with oppositely disposed faces of the pattern member, means for driving the rollers about axes lying in a plane generally perpendicular to the plane of the saw and a third pattern engaging roller mounted for rotation about an axis spaced from and generally parallel to the axes of said pair of rollers, the axis of said third roller lying in a plane with the axis of one of said rollers of said pair of rollers, said plane being generally parallel to the line of cut of the saw with said third roller and said one roller being disposed to engage the pattern member at points respectively in front of and behind the saw and on a face of the pattern member other than the face engaged by the other roller of said pair of rollers.

17. The combination descibed in claim 16 wherein said one roller and said third roller engage the pattern member at points substantially equally distant and in opposite directions from the cutting edge of the saw.

18. In combination with a sawing machine having a work table provided with an opening through which the saw operates in a plane generally transverse to the plane of the work table, a work unit adapted to be supported on said table, said unit including a work piece and a pattern member secured to the work piece, said pattern member having an upstanding rib formation presenting upstanding oppositely facing driving surfaces, work positioning means to be engaged by said rib formation, feeding means for the work unit comprising a pair of drive rollers, means mounting the drive rollers above the work table for rotation about spaced parallel axes positioned to disposed said rollers on opposite sides of said upstanding rib formation, resilient means urging said rollers into driving engagement with the oppositely facing driving surfaces of said rib formation, means for driving said rollers in a direction to feed the work piece into the saw, and means for urging said work piece laterally against said work positioning means.

References Cited in the file of this patent

UNITED STATES PATENTS

| 26,584 | Grosvenor | Dec. 27, 1859 |
| 82,113 | Grosvenor | Sept. 15, 1868 |
| 1,264,332 | Przepiorka | Apr. 30, 1918 |
| 1,293,956 | Sloan | Feb. 11, 1919 |
| 1,337,695 | Emery | Apr. 20, 1920 |
| 1,553,529 | Hayden | Sept. 15, 1925 |
| 1,639,039 | Knabusch et al. | Aug. 16, 1927 |
| 2,749,951 | Tetzner | June 12, 1956 |
| 2,754,858 | Davis | July 17, 1956 |
| 2,765,008 | Hawkins | Oct. 2, 1956 |

FOREIGN PATENTS

| 725,841 | Great Britain | Mar. 9, 1955 |